(12) United States Patent
Walker et al.

(10) Patent No.: US 11,171,852 B2
(45) Date of Patent: Nov. 9, 2021

(54) COMPUTER SYSTEM PRODUCTIVITY MONITORING

(71) Applicant: International Business Machines Corporation, Armonk, NY (US)

(72) Inventors: James William Walker, Littleborough (GB); Robert John Wallis, Stockport (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/449,042

(22) Filed: Jun. 21, 2019

(65) Prior Publication Data

US 2019/0312799 A1    Oct. 10, 2019

Related U.S. Application Data

(63) Continuation of application No. 14/482,551, filed on Sep. 10, 2014, now Pat. No. 10,374,917, which is a
(Continued)

(51) Int. Cl.
*H04L 12/26*  (2006.01)
*G06F 11/30*  (2006.01)
*G06F 11/34*  (2006.01)

(52) U.S. Cl.
CPC .......... *H04L 43/08* (2013.01); *G06F 11/3058* (2013.01); *G06F 11/3442* (2013.01);
(Continued)

(58) Field of Classification Search
CPC ..... H04L 43/04; H04L 43/08; H04L 43/0817; H04L 43/50; H04L 67/22; H04L 12/2803;
(Continued)

(56) References Cited

U.S. PATENT DOCUMENTS 5,872,972 A * 2/1999 Boland ................. G06F 9/5033
718/102
6,092,180 A * 7/2000 Anderson ............... G06F 8/445
712/200
(Continued)

FOREIGN PATENT DOCUMENTS

CA          2415770          1/2002
EP          1008940 A2 *  6/2000  ......... G06F 12/0817
(Continued)

OTHER PUBLICATIONS

"HP Service Health Analyzer", 2014, 4 pages.
(Continued)

*Primary Examiner* — Kostas J Katsikis
(74) *Attorney, Agent, or Firm* — Peter J. Edwards

(57) ABSTRACT

Embodiments of the inventive subject matter include a method for optimizing allocation of computers. The method can include gathering, via a plurality of sensors in a plurality of computers, information about devices of the computers. The method can include determining, via at least one of the processors, usage of the computers based on the information. The method can include determining, via at least one of the processors, performance of the computers based on the information. The method can include allocating, via at least one of the processors, certain ones of the computers for different uses based, at least in part, on the performance and usage of the computers.

18 Claims, 5 Drawing Sheets

Related U.S. Application Data continuation of application No. 14/306,505, filed on Jun. 17, 2014, now abandoned.

(52) U.S. Cl.
CPC .......... *H04L 43/04* (2013.01); *G06F 11/3003* (2013.01); *G06F 11/3409* (2013.01); *G06F 11/3466* (2013.01); *G06F 2201/865* (2013.01); *H04L 43/0817* (2013.01)

(58) Field of Classification Search
CPC ............. G06F 11/3442; G06F 11/3058; G06F 11/3466; G06F 11/3409; G06F 11/3003; G06F 2201/865; G06F 11/34; G06F 11/302; G06F 11/3024; G06F 11/3027; G06F 11/3031; G06F 11/3034; G06F 11/3037; G06F 11/3041; G06F 11/3051; G06F 11/3065; G06F 11/3089; G06F 11/3096; G06F 11/3062; G06F 11/3093; G06F 1/206; G06Q 10/30; G06Q 10/0635

See application file for complete search history.

(56) References Cited

U.S. PATENT DOCUMENTS

| | | | |
|---|---|---|---|
| 7,228,371 B2 | 6/2007 | Schneider et al. | |
| 7,577,770 B2* | 8/2009 | Tanaka | G06F 11/3419 710/14 |
| 8,370,825 B2 | 2/2013 | Curtis et al. | |
| 8,433,848 B1 | 4/2013 | Naamad et al. | |
| 8,762,538 B2 | 6/2014 | Dutta et al. | |
| 8,806,015 B2 | 8/2014 | Dutta et al. | |
| 8,954,584 B1 | 2/2015 | Subbarayan et al. | |
| 9,065,783 B2 | 6/2015 | Ding et al. | |
| 9,185,008 B1* | 11/2015 | Stickle | G06F 11/3093 |
| 9,207,984 B2* | 12/2015 | Sivasubramanian | G06F 9/5011 |
| 9,317,343 B1* | 4/2016 | Willhoit | G06F 9/542 |
| 9,330,119 B2* | 5/2016 | Chan | G06F 16/22 |
| 9,336,055 B2* | 5/2016 | Arao | G06F 11/3423 |
| 9,336,111 B1* | 5/2016 | King | G06F 11/3003 |
| 9,411,847 B2* | 8/2016 | Margalit | G06F 11/3051 |
| 9,432,256 B2 | 8/2016 | Terayama | G06F 9/5072 |
| 9,722,945 B2* | 8/2017 | Siciliano | G06F 9/505 |
| 10,445,208 B2* | 10/2019 | Xia | G06F 3/0605 |
| 10,452,538 B2* | 10/2019 | van Riel | G06F 13/3452 |
| 10,574,511 B2* | 2/2020 | Willhoit | H04L 41/0631 |
| 10,783,002 B1* | 9/2020 | Dubey | G06F 11/3428 |
| 2002/0069279 A1 | 6/2002 | Romero et al. | |
| 2002/0104920 A1 | 8/2002 | Thompson et al. | |
| 2002/0178075 A1 | 11/2002 | Emerick et al. | |
| 2003/0233391 A1 | 12/2003 | Crawford, Jr. et al. | |
| 2004/0123067 A1* | 6/2004 | Sprangle | G06F 12/0215 711/204 |
| 2004/0133395 A1 | 7/2004 | Ding et al. | |
| 2004/0181794 A1 | 9/2004 | Coleman et al. | |
| 2004/0267897 A1 | 12/2004 | Hill et al. | |
| 2005/0107997 A1 | 5/2005 | Watts et al. | |
| 2005/0160133 A1 | 7/2005 | Greenlee et al. | |
| 2005/0172079 A1 | 8/2005 | McFarling | |
| 2005/0222819 A1 | 10/2005 | Boss et al. | |
| 2006/0085544 A1 | 4/2006 | Chen et al. | |
| 2006/0089844 A1 | 4/2006 | Dickinson et al. | |
| 2006/0112375 A1 | 5/2006 | Schneider | |
| 2006/0242377 A1 | 10/2006 | Kanie et al. | |
| 2006/0259686 A1* | 11/2006 | Sonobe | G06F 3/061 711/114 |
| 2007/0005903 A1* | 1/2007 | Lau | G06F 3/0674 711/137 |
| 2007/0168047 A1* | 7/2007 | Cromer | G11B 19/04 700/1 |
| 2007/0266391 A1* | 11/2007 | Hoffman | G06F 11/3419 718/106 |
| 2007/0271570 A1 | 11/2007 | Brown et al. | |
| 2008/0071939 A1* | 3/2008 | Tanaka | G06F 11/3419 710/18 |
| 2008/0185432 A1 | 8/2008 | Caballero et al. | |
| 2009/0150895 A1 | 6/2009 | Pullo | |
| 2009/0204853 A1 | 8/2009 | Diggs et al. | |
| 2010/0138684 A1* | 6/2010 | Kim | G06F 1/324 713/601 |
| 2010/0216477 A1 | 8/2010 | Ryan | |
| 2010/0217949 A1* | 8/2010 | Schopp | G06F 9/5077 711/173 |
| 2010/0250748 A1* | 9/2010 | Sivasubramanian | G06F 11/3442 709/226 |
| 2010/0299167 A1 | 11/2010 | Mulvanny | |
| 2010/0304754 A1* | 12/2010 | Czompo | H04W 52/0254 455/456.1 |
| 2011/0016342 A1 | 1/2011 | Rowan et al. | |
| 2012/0102009 A1* | 4/2012 | Peterson | G06F 16/10 707/705 |
| 2012/0284408 A1 | 11/2012 | Dutta et al. | |
| 2012/0317578 A1* | 12/2012 | Kansal | G06F 9/5077 718/104 |
| 2012/0324114 A1 | 12/2012 | Dutta et al. | |
| 2013/0185433 A1 | 7/2013 | Zhu et al. | |
| 2013/0219051 A1 | 8/2013 | Etchegoyen | |
| 2013/0262813 A1* | 10/2013 | Muroyama | G06F 3/061 711/171 |
| 2014/0143781 A1* | 5/2014 | Yao | G06F 9/4856 718/100 |
| 2014/0195297 A1* | 7/2014 | Abuelsaad | G06Q 10/0635 705/7.28 |
| 2014/0201477 A1 | 7/2014 | Greenfield et al. | |
| 2014/0307701 A1 | 10/2014 | Markwart et al. | |
| 2014/0317361 A1* | 10/2014 | Dally | G06F 13/161 711/154 |
| 2014/0380307 A1* | 12/2014 | Zhu | G06F 9/5072 718/1 |
| 2015/0052241 A1 | 2/2015 | Walker et al. | |
| 2015/0134815 A1 | 5/2015 | Walker et al. | |

FOREIGN PATENT DOCUMENTS

| | | | | |
|---|---|---|---|---|
| JP | 2008090546 | | 4/2008 | |
| WO | WO-2012019475 A1 * | 2/2012 | ......... G06F 12/0207 |
| WO | 2012049707 | | 4/2012 | |

OTHER PUBLICATIONS

"Predictive Maintenance Maximizes Uptime and Minimizes Costs", 2014, 2 pages.
"U.S. Appl. No. 14/306,505 First Office Action", dated Jan. 21, 2016, 10 pages.
"U.S. Appl. No. 14/306,505 First Office Action", dated Mar. 18, 2016, 15 pages.
"U.S. Appl. No. 14/306,505 Office Action", dated May 20, 2016, 21 pages.
"U.S. Appl. No. 14/482,551 Final Office Action", dated Oct. 18, 2018, 19 pages.
"U.S. Appl. No. 14/482,551 Final Office Action", dated Jun. 14, 2018, 22 pages.
"U.S. Appl. No. 14/482,551 Final Office Action", dated Sep. 11, 2017, 20 pages.
"U.S. Appl. No. 14/482,551 Office Action", dated Dec. 8, 2017, 30 pages.

* cited by examiner

COMPUTER SYSTEM PRODUCTIVITY MONITORING

RELATED APPLICATIONS

This application is a Continuation of and claims the priority benefit of United States of America application Ser. No. 14/482,551 filed Sep. 10, 2014, which is a continuation of United States of America application Ser. No. 14/306,505 filed Jun. 17, 2014, which claims priority under 35 U.S.C. § 119 from United Kingdom Patent Application No. 1314619.6, filed on Aug. 15, 2013, which is incorporated by reference in its entirety.

FIELD OF INVENTION

The inventive subject matter relates to the field of computer system monitoring. In particular, the invention relates to computer system productivity monitoring.

BACKGROUND OF INVENTION

In the vast majority of office environments, employees are allocated a computer to use as a workstation. This workstation is typically used for a period of 3-5 years, and then refreshed due to a number of factors such as:

1. Depreciation of the workstation. Computers typically depreciate their total value over a period of three years, meaning that a refresh cycle is usually no shorter than three years.
2. Advances in technology leading to cost savings. Newer technology may be introduced which can offer the company cost savings over currently deployed systems, with features such as enhanced power efficiency.
3. Lack of support for older systems. Old hardware and software typically requires increased support costs over time. This can be a driver for the replacement of older systems with new systems that are cheaper to support.
4. Damage to the workstation. As a workstation is used, the condition degrades over time. This can eventually make the machine likely to fail, or no longer fit for purpose.

Points 1, 2 and 3 are typically mitigated by companies by employing a strategy of issuing a hardware refresh every set number of years, typically between 3 and 5. The length of time may be manually altered based on strategic choices; for example, if a particular operating system is going out of support soon, the hardware refresh might be accelerated to take this into account.

Point 4 is much more difficult to mitigate using a broad stroke approach. It is difficult for an organization to quantify the effect of wear and tear, and put definite metrics against loss of productivity due to the machine being less fit for purpose.

A typical example of the user losing productivity due to an old workstation would be if the workstation were no longer quick enough to run the most recent version of the standard email client in a satisfactory manner. The email program could take two minutes to load in the morning instead of 30 seconds. This would likely result in the worker going for a five minute coffee break, which results in that time being lost on a regular basis.

A hardware refresh can be costly to a business. It is not only the cost of the new workstations, but the cost of disposal of the old workstations, loss of productivity during workstation migration, and environmental impact if the refresh is carried out more often than necessary

BRIEF SUMMARY OF THE INVENTION

According to a first aspect of the inventive subject matter, there is provided a method for computer system productivity monitoring, comprising: monitoring a computer system by gathering data from multiple sensors in the computer system; generating a profile of performance of the computer system; generating a profile of usage of the computer system; analyzing the profile of performance with respect to the profile of usage; and determining if the performance of the computer system inhibits productivity for the profile of usage.

Generating a profile of performance of the computer system and generating a profile of usage of the computer system may be generated for a common time period. The monitoring of a computer system may be carried out a predefined time before a scheduled replacement of the computer system until the computer system is decommissioned. Multiple computer systems may be monitored over a given period of time.

The method may include determining if the computer system is suitable for another use. Determining if the computer system is suitable for another use may include: analyzing the profile of performance of the computer system with respect to a profile of usage of another computer system; and determining if the performance of the computer system inhibits productivity for the profile of usage of the other computer system.

Analyzing the profile of performance with respect to the profile of usage may include a weighting function between aspects of usage and performance.

The multiple sensors in the computer system may include one or more of the group of: a hard disk drive accelerometer, an internal temperature sensor, an external temperature sensor, a processor usage sensor, a disk access sensor, a peak resource usage sensor, a battery life sensor, a power source sensor, and a sensor of use of applications.

Generating a profile of performance may use low level monitoring of resources. The profile of performance may include aspects of one or more of the group of: resource performance including processor performance, disk drive access frequency, disk drive access latency, speed of running applications, temperature, and battery lifetime.

Generating a profile of usage may use high level monitoring of resources. The profile of usage may include aspects of one or more of the group of: application being run, accelerometer data regarding physical handling, battery usage, power usage, and temperature of surroundings.

Analyzing the profile of performance with respect to the profile of usage may include analyzing one or more of the group of: peak resource usage, activities carried out on an application, movement analysis, power usage analysis, temperature analysis.

According to a second aspect of the inventive subject matter, there is provided a system for computer system productivity monitoring, comprising: a data collection component for monitoring a computer system by gathering data from multiple sensors in the computer system; a performance profile component for generating a profile of performance of the computer system; a usage profile component for generating a profile of usage of the computer system; an analysis component for analysing the profile of performance with respect to the profile of usage; and a decision component for determining if the performance of the computer system inhibits productivity for the profile of usage.

The performance profile component for generating a profile of performance of the computer system and the usage profile component for generating a profile of usage of the computer system may use a common time period.

The data collection component for monitoring of a computer system may carry out the monitoring a predefined time before a scheduled replacement of the computer system until the computer system is decommissioned.

The data collection component may monitor multiple computer systems over a given period of time.

The decision component may also be for determining if the computer system is suitable for another use. The decision component for determining if the computer system is suitable for another use may include: the analysis component for analyzing the profile of performance of the computer system with a profile of usage of another computer system; and the decision component determining if the performance of the computer system inhibits productivity for the profile of usage of the other computer system.

The analysis component for analyzing the profile of performance with respect to the profile of usage may include a weighting component for applying a function between aspects of usage and performance.

The multiple sensors in the computer system may include one or more of the group of: a hard disk drive accelerometer, an internal temperature sensor, an external temperature sensor, a processor usage sensor, a disk access sensor, a peak resource usage sensor, a battery life sensor, a power source sensor, and a sensor of use of applications.

The profile of performance may include aspects of one or more of the group of: resource performance including processor performance, disk drive access frequency, disk drive access latency, speed of running applications, and temperature, battery lifetime.

The profile of usage may include aspects of one or more of the group of: application being run, accelerometer data regarding physical handling, battery usage, power usage, and temperature of surroundings.

The analysis component for analyzing the profile of performance with respect to the profile of usage may include analyzing one or more of the group of: peak resource usage, activities carried out on an application, movement analysis, power usage analysis, and temperature analysis.

According to a third aspect of the inventive subject matter, there is provided a computer program product for computer system productivity monitoring, the computer program product comprising: a computer readable storage medium readable by a processing circuit and storing instructions for execution by the processing circuit for performing a method according to the first aspect of the inventive subject matter.

According to a fourth aspect of the inventive subject matter, there is provided a computer program stored on a computer readable medium and loadable into the internal memory of a digital computer, comprising software code portions, when said program is run on a computer, for performing the method of the first aspect of the inventive subject matter.

According to a fifth aspect of the inventive subject matter, there is provided a method substantially as described with reference to the figures.

According to a sixth aspect of the inventive subject matter, there is provided a system substantially as described with reference to the figures.

The described aspects of the inventive subject matter provide the advantage of providing an assessment of the productivity of a computer system to guide a refresh program to drive the prioritization of system upgrades and replacements. The assessment aims to avoid unnecessary system replacement whilst preventing inefficiency due to computer system operation restraints.

SUMMARY

Embodiments of the inventive subject matter include gathering, from a plurality of sensors of a computer system, information about the computer system. Embodiments further include generating a profile of performance of the computer system indicating a state of components of the computer system during use. Embodiments further include generating a profile of usage of the computer system indicating current activities and usage of the computer system. Embodiments further include analyzing the profile of performance of the computer system against the profile of usage of the computer system to determine if the state of the components of the computer system during use is acceptable for the current activities and usage of the computer system. Embodiments further include determining that productivity of the computer system is inhibited based, at least in part, on the analyzing the profile of performance of the computer system against the profile of usage of the computer system.

BRIEF DESCRIPTION OF THE DRAWINGS

The subject matter regarded as the inventive subject matter is particularly pointed out and distinctly claimed in the concluding portion of the specification. The inventive subject matter, both as to organization and method of operation, together with objects, features, and advantages thereof, may best be understood by reference to the following detailed description when read with the accompanying drawings.

Preferred embodiments of the inventive subject matter will now be described, by way of example only, with reference to the following drawings in which.

DESCRIPTION OF EMBODIMENT(S)

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the inventive subject matter. However, it will be understood by those skilled in the art that the inventive subject matter may be practiced without these specific details. In other instances, well-known methods, procedures, and components have not been described in detail so as not to obscure the inventive subject matter.

Methods and systems are provided for monitoring aspects of a computer system including hardware sensor data to build a profile of the usage of the workstation. The profile may be used to assess whether the performance of the workstation is an inhibitor to productivity, and thus whether an upgraded workstation would be justified by the resultant productivity gains, or alternatively, if the workstation's performance is satisfactory for its current usage.

The analysis may be carried out in or around the standard refresh window for the computer system. That is, if standard policy is to refresh a computer system at 4 years, this analysis should be in place, for example, for a period of 2-6 years from the last refresh.

Over time, performance and suitability for use of a workstation declines. For certain uses, that decline becomes significant earlier, while for other uses, the decline has less of an impact. It would be advantageous to have a means for tying these factors together to achieve maximum useful life from a workstation.

A method is described of combining various metrics with logs showing the types of activity the system is used for. These factors, taken together, give a better image of when the useful life of the machine is coming to an end. The factors may be combined using weighting factors to flag up the approach to end of useful life. The factors may be combined as a weighted function of usage of the machine.

Figure 1:
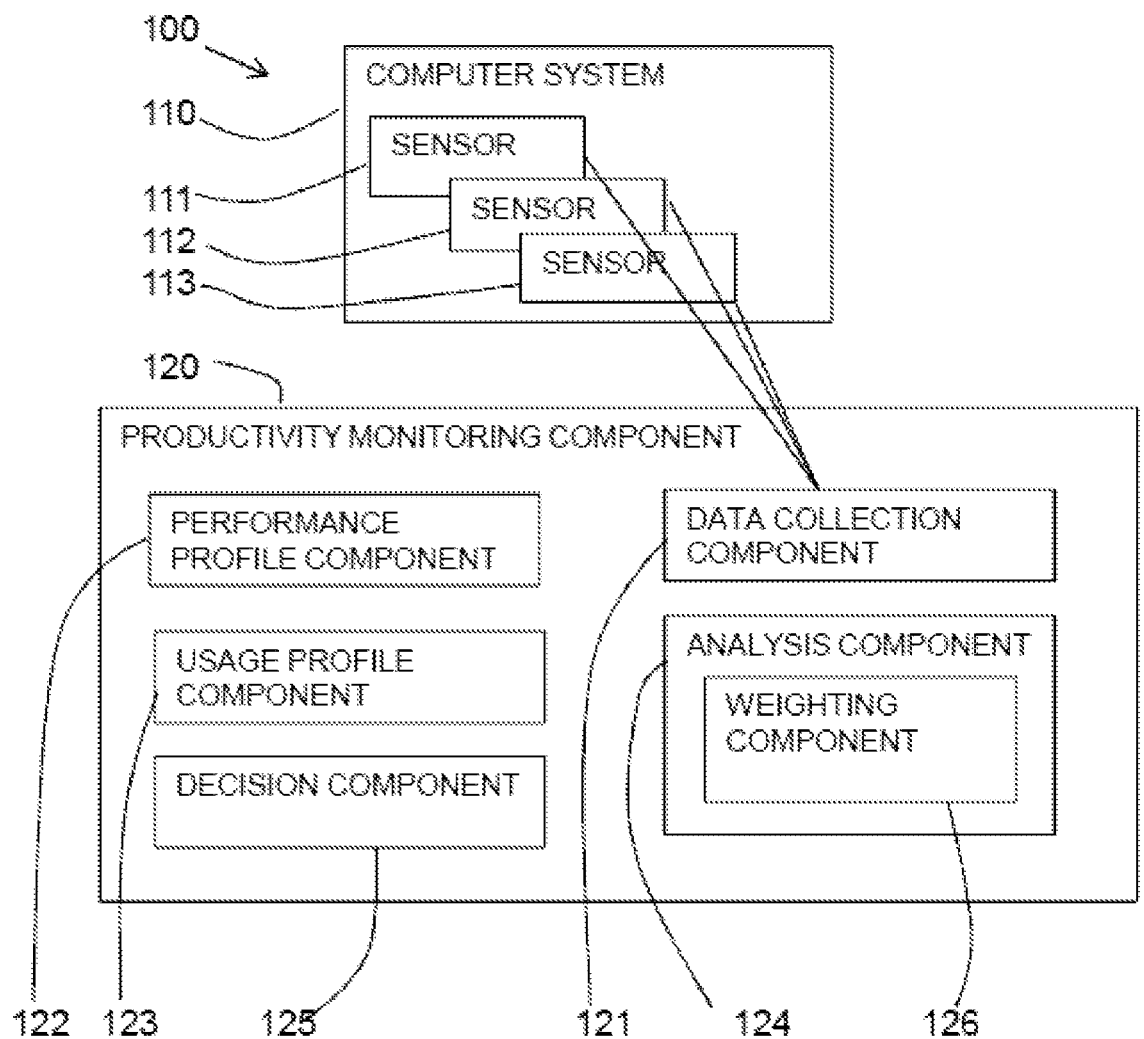
FIG. 1 is block diagram of an example embodiment of a system 100 in accordance with the inventive subject matter.

Referring to FIG. 1, a block diagram shows an example embodiment of the described system 100.

A computer system 110 is shown which is to be monitored. Multiple computer systems may be monitored simultaneously, particularly across multiple computer systems of an enterprise.

The computer system 110 to be monitored may be a desktop computer, a laptop computer, a tablet computer, a smart phone, a server computer, etc. The computer system 110 may have multiple sensors 111-113 for collecting data relating to the performance of the computer system 110. Further details of an example computer system having multiple sensors is shown in FIG. 2.

A productivity monitoring component 120 is provided which may include a data collection component 121 for collecting data from the sensors 111 of the computer system. The productivity monitoring component 120 may include a performance profile component 122 for generating a profile of resource performance and other monitored metrics of the computer system 110, and a usage profile component 123 for generating a profile of the current activities and use of the computer system 110.

An analysis component 124 may be provided for comparing the performance profile and the usage profile (i.e., the profile of performance of the computer system is analyzed against the profile of usage of the computer system). The analysis component 124 may include a weighting component 126 for providing a weighting function based on the usage profile generated by the usage profile component 123. The analysis component 124 may assess the performance profile and usage profile components together; for example, if one resource is under performing, then this may be correlated to the usage of another resource, which builds the case for a system upgrade.

Figure 2:
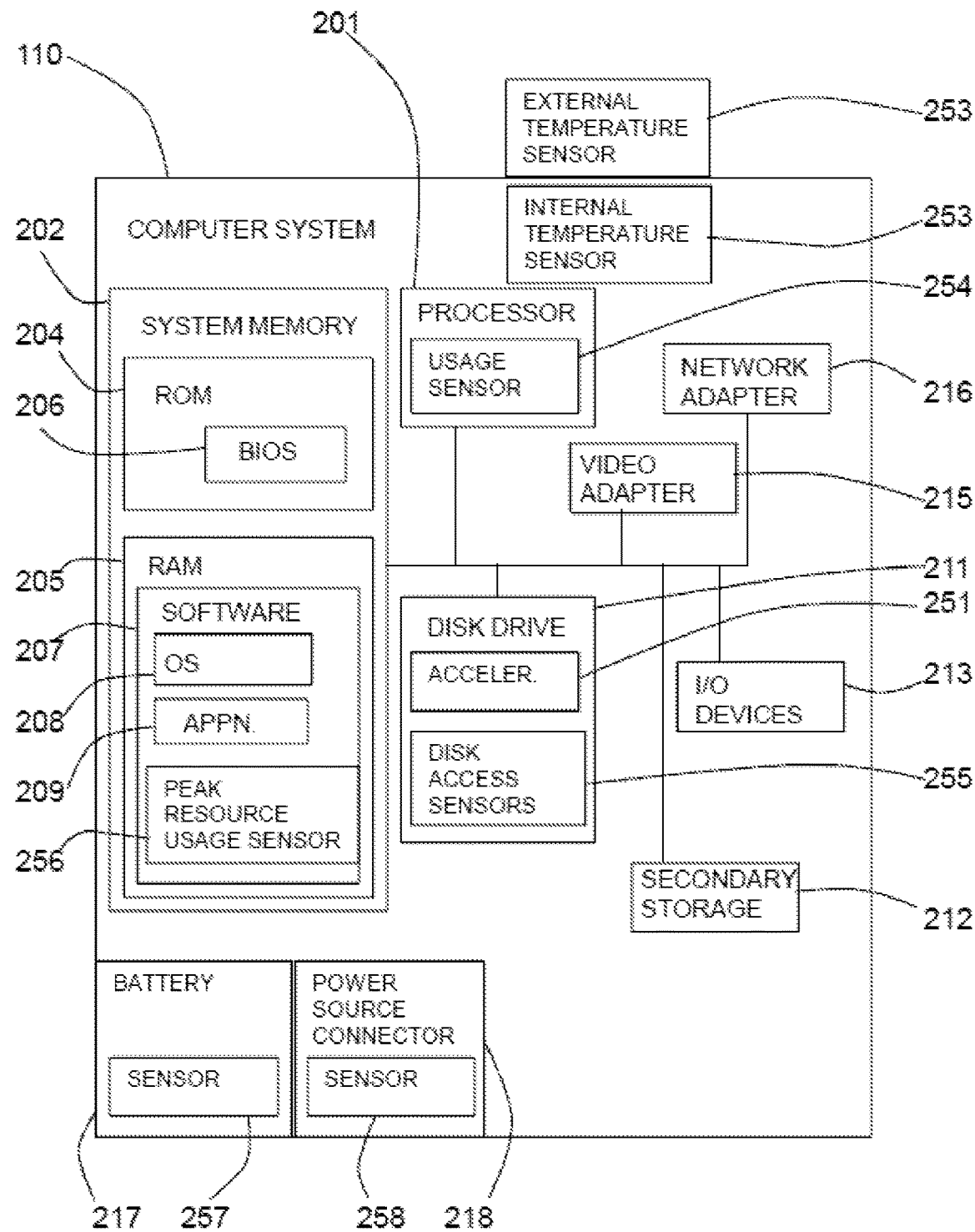
FIG. 2 is a block diagram of an example embodiment of a computer system 110 being monitored in accordance with the inventive subject matter.

A decision component 124 may be provided for determining whether a computer system 110 should be transferred to another use or discontinued and the system upgraded Referring to FIG. 2, a block diagram shows a computer system 110 with its principle components and multiple sensors for data collection.

The computer system 110 may include at least one processor 201 coupled directly or indirectly to memory elements through a bus system 203.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 209 may also be stored in RAM 205.

The system 110 may also include a primary storage means such as a magnetic hard disk drive 211 and secondary storage means 212 such as a magnetic disc drive or an optical disc drive. Software applications may be stored on the primary and secondary storage means 211, 212 as well as the system memory 202.

The computing system 110 may include a power source connector 218 for connecting to an external power source and a battery 217 for powering the computer system 110 when it is not connected to an external power source.

The computing system 110 may operate in a networked environment using logical connections to one or more remote computers via a network adapter 216.

Input/output devices 213 may be coupled to the system either directly or through intervening I/O controllers. A user may enter commands and information into the system 110 through input devices such as a keyboard, pointing device, or other input devices (for example, microphone, joy stick, game pad, satellite dish, scanner, or the like). Output devices may include speakers, printers, etc. A display device (not shown) may be connected to system bus 203 via an interface, such as video adapter 215.

Sensors for data collection may be provided in the form of sensors monitoring the operation of the components of the computer system 110. The following sensors 251-258 may be provided and may gather data for one or both of the performance profile and the usage profile of the computer system 110. In some embodiments, the sensors include:

A hard disk drive accelerometer 251 for sensing if the computer system 110 is moved, how often, for what duration, and how roughly it is handled. This may be particularly useful for portable computer systems.

One or more internal temperature sensors 252 for sensing the temperature of one or more areas or components of the computer system.

An external temperature sensor 253 for monitoring the surroundings in which the computer system is used.

A CPU usage sensor 254 to determine the percentage of CPU usage of the computer system.

Disk access sensors 255 including disk access frequency and latency to determine the performance of the disk drive.

A peak resource usage sensor 256 for determining maximum resource usage of the computer system.

A battery life sensor 257 to sense the status of the battery.

A power source sensor 258 for sensing how often the computer system is being charged or whether it is always using a power source.

A sensor of use of applications 259 installed on the computer system; for example, for determining high performance requirements for complex applications.

Figure 3:
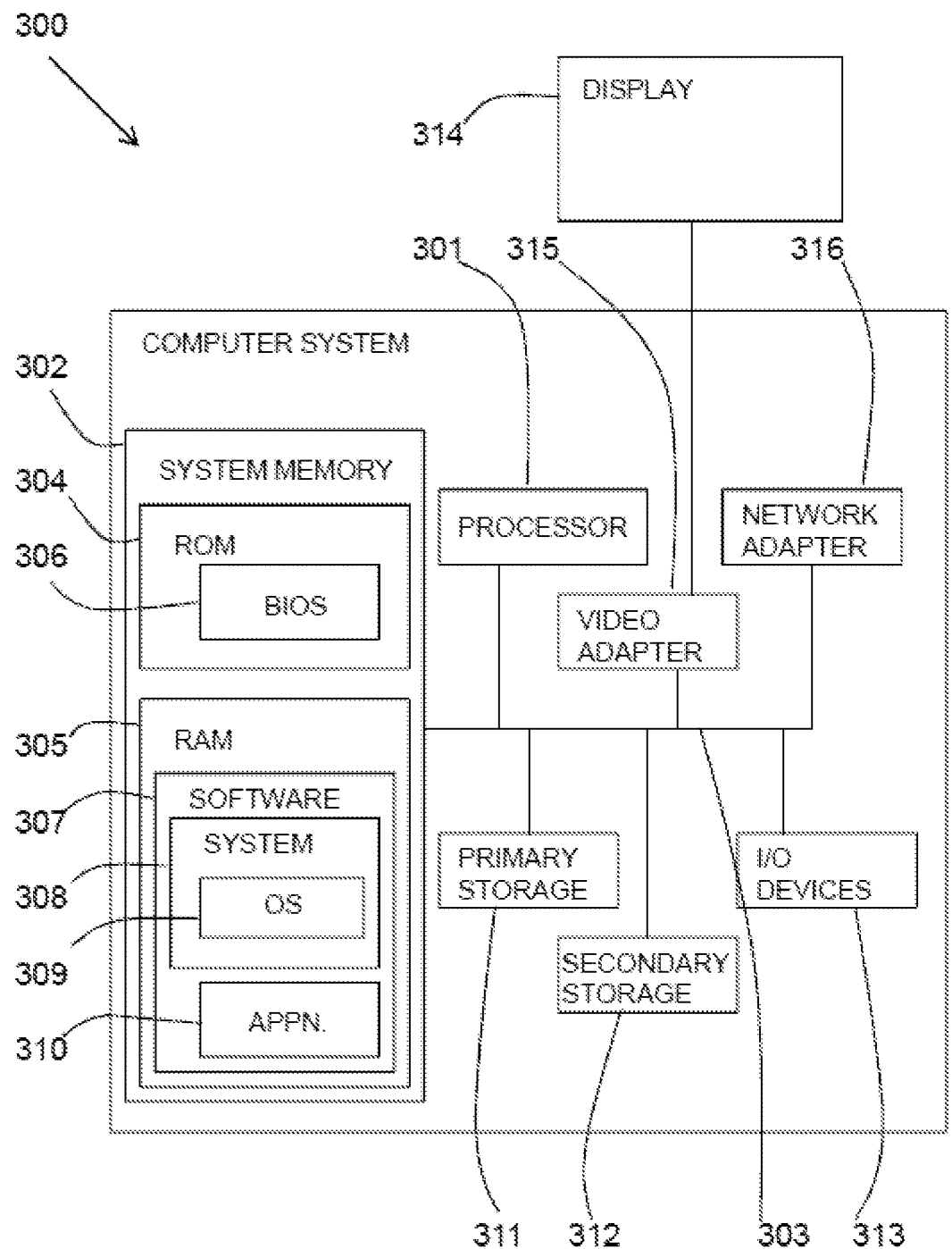
FIG. 3 is a block diagram of an embodiment of a computer system 300 in which the inventive subject matter may be implemented.

Referring to FIG. 3, an exemplary system for implementing aspects of the inventive subject matter such as the productivity monitoring component includes a data processing system 300 suitable for storing and/or executing program code including at least one processor 301 coupled directly or indirectly to memory elements through a bus system 303. The memory elements may include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Figure 4:
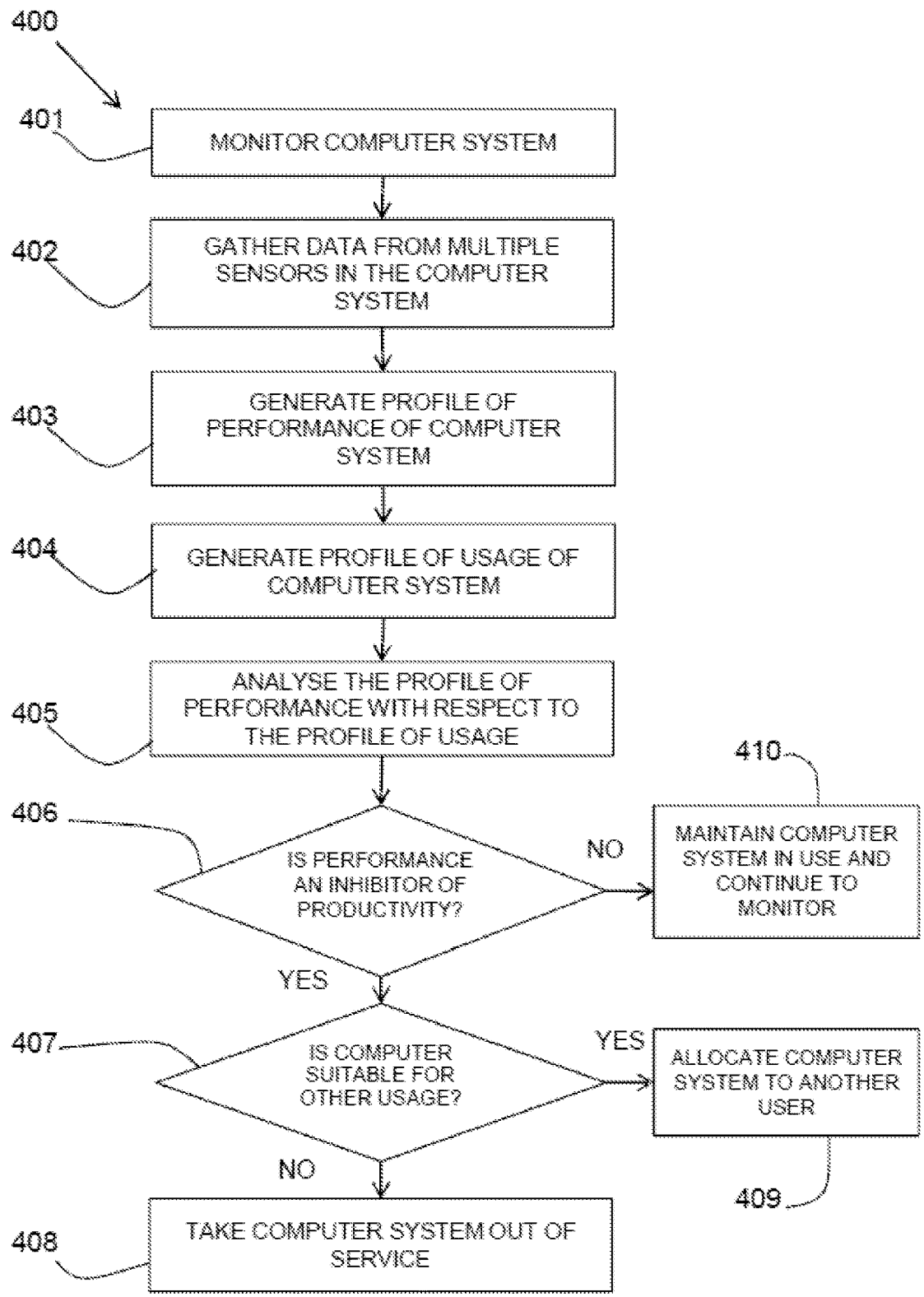
FIG. 4 is a flow diagram of an example embodiment of an aspect of a method in accordance with the inventive subject matter.

Referring to FIG. 4, a flow diagram 400 shows an example embodiment of the described method.

The method may start monitoring 401 a computer system which may be one of multiple computer systems being monitored simultaneously. The monitoring may be carried out within a given time period of a scheduled refresh of hardware and/or software.

Data may be gathered 402 from multiple sensors provided in the computer system. This data may be gathered over a set period of time or continuously. The data may be gathered from sensors as described in relation to FIG. 3 above.

A profile may be generated 403 of the performance of the computer system including resource performance such as the CPU usage, disk drive access frequency, and latency, speed of running applications, and other metrics, such as temperature, battery lifetime, etc.

Resource monitoring for the generation of a performance profile may be the lowest level of monitoring available for a resource. For example:
Fan spin speeds as a percentage of rated maximum;
Battery charge level after 10 minutes of charging;
Hard disk drive sequential read throughput;
Hard disk drive average seek time for random block read and write;
Hard disk drive platter vibration levels.

A profile may be generated 404 of the usage of the computer system including applications being run, accelerometer data regarding the physical handling of the computer system, battery/power usage, temperature of surroundings, etc.

Usage monitoring for generating a usage profile may be a higher level of profiling, usually from the Operating System point of view, including:
CPU usage;
Hard disk drive usage;
System temperature;
System movement;
Battery usage.

The data gathered 402 from the sensors may be used for generating both the performance profile and the usage profile.

The method may analyze 405 the profile of the performance with respect to a profile of the usage relating to the types of activity the computer system is used for. The analysis may use weighting functions for different activities.

For example, such weighting functions may recognize that machines that do heavy lifting for software development have a greater weighting towards processor metrics, and users that use presentation software may have a greater weighting towards the portability factors and hard disk drive vibration monitors.

The analysis 405 may assess the performance profile and usage profile components together; for example, if one resource is under performing, then this may be correlated to the usage of another resource, which builds the case for a system upgrade.

The method may determine 406 if the analysis indicates that the performance of the computer system is an inhibitor to productivity of the user for current usage and activities. If so, determine 407 if the computer system is suitable for other activities, for example, as shown by a profile of usage of another computer system. If it is not suitable for other activities, it may be taken out of service 408. If it is suitable for other activities it may be allocated 409 to another user.

If the computer system is not an inhibitor to productivity, it may be maintained 410 in its current role and may be continued to be monitored 401.

Multiple computer systems may be monitored simultaneously within an enterprise. The monitoring method may be carried out remotely via a network connection with each computer system. An overall allocation of computer systems may be optimized within an enterprise by analyzing the monitored data.

In some embodiments, the analysis may include the following aspects compared between performance and usage.

Peak Resource Usage

Peak resource usage is a metric that is derived from looking at a number of factors such as CPU usage and disk latency over a period of time.

If peak resource usage regularly approaches 100% for any individual resource or a mixture of resources for a sustained burst of activity (between 3 and 20 seconds), then this may indicate that a particular application is struggling to perform to the user's expectations given the constraints of the resources it has at its disposal.

If a resource is used consistently highly (for example, CPU usage rarely drops below 60%) then this may be an indicator that the software being used by the user is not suitable for this hardware, and would benefit from more modern equipment.

Software Analysis

If a workstation has known development software installed, then the resource usage of the workstation can be mapped against known profiles for given activities with that software. For example, two developers may have identical copies of the development software installed on their machines, but they may be programming in different projects. In this example, one is working on a large Java (Java is a trademark of Sun Microsystems, Inc.) project with code coverage tools, and the other in Perl (Perl is a trademark of Perl.org). The Java programmer can be expected to drive higher resource utilization due to the relatively high overheads of running the Java virtual machine in order to complete testing, and code coverage profiling. In this case, the Java programmer would have a strong case to have a more powerful machine, and thus a quicker hardware refresh.

Movement Analysis

Hard disk drive accelerometer data can be used to assess how often a laptop is removed from a desk. This can in turn be used to identify that the machine is used while travelling, or on multiple sites. This would imply that the user would benefit from any new technology to improve portability, so could be considered for a quicker refresh if this technology were made available Power Usage Battery life data can be used to determine whether a user has to plug his/her laptop into an external power supply more often due to a degraded battery. This can indicate that the user has been forced to change their natural workflow due to a new hardware constraint, and would benefit from a replacement battery or hardware refresh in order to restore lost productivity.

If it is seen that at the end of the computer system lifecycle, the user is not being inhibited by the computer system performance, the life of the machine may be extended. A typical example could be a computer system used by a manager that simply runs email, a web browser and an editor program. These may not have a great system impact, so the current computer system may be sufficient and fit for purpose.

Figure 5A:
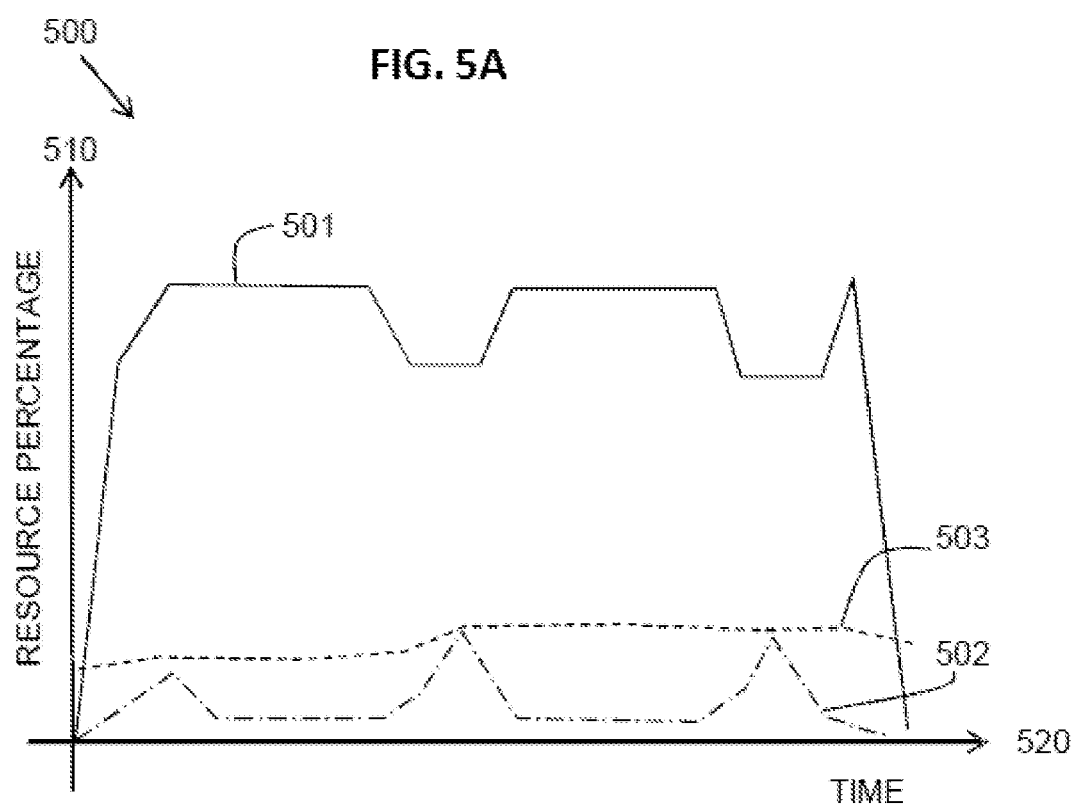
FIGS. 5A and 5B are schematic diagrams showing example computer system performance monitoring situations.
Figure 5B:
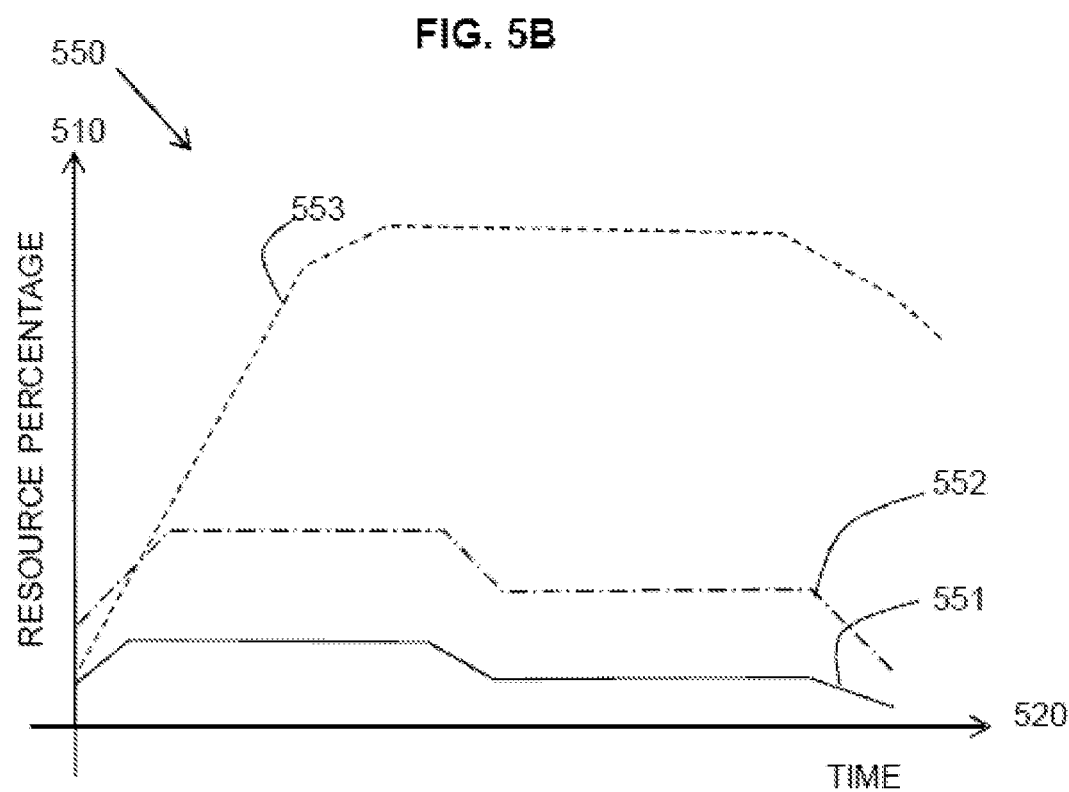

Referring to FIGS. 5A and 5B, graphs 500, 550 show two examples where the computer system is not performing due to resource constraints. The graphs 500, 550 show the resource percentage used 510 against time 520 for a hard disk drive 501, 551, a CPU 502, 552, and temperature 503, 553. In the case of temperature 503, 553, the resource percentage is the temperature rise.

In FIG. 5A, the graph 500 shows a hard disk bound task in which the percentage of usage of the hard disk drive 501 is consistently very high. In FIG. 5B, the graph 550 shows a cooling bound task in which the temperature 553 is too high resulting in the throttling of CPU 551 and hard disk drive 552 to prevent damage to the computer system.

In both cases, the amount of work done by the application in a set amount of time is reduced, which would lead to longer response times and lead to user frustration, in turn leading to loss of productivity.

EXAMPLE

A laptop has been heavily used, has been used in extreme heat conditions, and has been dropped several times over its lifetime. It has developed several flagged bad sectors on disk, and it occasionally shuts down because of overheating.

A) It is used for heavy graphics rendering for use in a vital real-time service—the described monitoring and analysis indicates that it has likely already come to the end of its useful life.
B) It is used for occasional Internet browsing and intermittent access to emails—the described monitoring and analysis indicates that its useful life may continue for some time.

The inventive subject matter can take the form of an entirely hardware embodiment, an entirely software embodiment or an embodiment containing both hardware and software elements. In a preferred embodiment, the inventive subject matter is implemented in software, which includes but is not limited to firmware, resident software, microcode, etc.

The inventive subject matter can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the inventive subject matter.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Use of the phrase "at least one of . . . or" should not be construed to be exclusive unless explicitly stated or recited otherwise. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (e.g., X can comprise {A, B, Z}).

What is claimed is:

1. A method for optimizing allocation of computers, the method comprising:

gathering, via a plurality of sensors in a plurality of computers, information about devices of the computers, wherein the plurality of sensors comprises a disk access sensor within a disk drive and a hard disk drive accelerometer and wherein the information includes a disk drive access latency value of the disk drive gathered by the disk access sensor and wherein the information includes accelerometer data of the hard disk drive;

determining, via at least one processor, usage of the computers based on the information, wherein the determination of the usage accounts for movement analysis of the hard disk drive;

determining, via the at least one processor, performance of the computers based on the information, wherein the determination of the performance accounts for the gathered disk drive access latency value of the disk drive; and allocating, via the at least one processor, certain ones of the computers for different uses based, at least in part, on the performance and usage of the computers.

2. The method of claim 1, wherein the gathering occurs for a time period and the performance is for the time period.

3. The method of claim 1, wherein the gathering occurs over a time period beginning at a predefined time before scheduled replacement of the devices and ending when the computers are decommissioned.

4. The method of claim 1, wherein the usage of the computers is different for two or more of the computers.

5. The method of claim 1 further comprising:

for each of the computers, analyzing the performance of the computer and the usage of the computer to determine the different uses.

6. The method of claim 1, wherein the performance of the computers includes resource performance of the computers, disk drive access frequency of disk drives in the computers, speed of running applications in the computers, temperature in the computers, or battery life of the computers.

7. A computer readable program product including a computer readable storage device including program code which, when executed by a processor, performs operations for optimizing allocation of computers, the program code comprising:

program code to gather, via a plurality of sensors in a plurality of computers, information about devices of the computers, wherein the plurality of sensors comprises a hard disk drive accelerometer and wherein the information includes accelerometer data of the hard disk drive;

program code to determine, via the processor, usage of the computers based on the information, wherein the determination of the usage accounts for the movement analysis of the hard disk drive;

program code to determine, via the processor, performance of the computers based on the information; and program code to allocate, via the processor, certain ones of the computers for different uses based, at least in part, on the performance and usage of the computers.

8. The computer readable program product of claim 7, wherein the program code to gather operates to gather information about the plurality of computers over a time period and the performance is for the time period.

9. The computer readable program product of claim 7, wherein the program code to gather operates over a time period beginning at a predefined time before scheduled replacement of the devices and ending when the computers are decommissioned.

10. The computer readable program product of claim 7, wherein the usage of the computers is different for two or more of the computers.

11. The computer readable program product of claim 7 further comprising:

program code to, for each of the computers, analyze the performance of the computer and the usage of the computer to determine the different uses.

12. The computer readable program product of claim 7, wherein the performance of the computers includes resource performance of the computers, disk drive access frequency of disk drives in the computers, speed of running applications in the computers, temperature in the computers, or battery life of the computers.

13. An apparatus comprising:

one or more processors;

one or more computer readable program products including a computer readable storage device including program code which, when executed by at least one of the processors, performs operations for optimizing allocation of computers, the program code comprising:

program code to gather, via a plurality of sensors in a plurality of computers, information about devices of the computers, wherein the plurality of sensors comprises a disk access sensor within a disk drive and a hard disk drive accelerometer and wherein the information includes a disk drive access latency value of the disk drive gathered by the disk access sensor and wherein the information includes accelerometer data of the hard disk drive;

program code to determine, via at least one of the processors, usage of the computers based on the information, wherein the determination of the usage accounts for movement analysis of the hard disk drive;

program code to determine, via at least one of the processors, performance of the computers based on the information, wherein the determination of the performance accounts for the gathered disk drive access latency value of the disk drive; and program code to allocate, via at least one of the processors, certain ones of the computers for different uses based, at least in part, on the performance and usage of the computers.

14. The apparatus of claim 13, wherein the program code to gather operates to gather information about the plurality of computers over a time period and the performance is for the time period.

15. The apparatus of claim 13, wherein the program code to gather operates over a time period beginning at a predefined time before scheduled replacement of the devices and ending when the computers are decommissioned.

16. The apparatus of claim 13, wherein the usage of the computers is different for two or more of the computers.

17. The apparatus of claim 13 further comprising:

program code to, for each of the computers, analyze the performance of the computer and the usage of the computer to determine the different uses.

18. The apparatus of claim 13, wherein the performance of the computers includes resource performance of the computers, disk drive access frequency of disk drives in the computers, speed of running applications in the computers, temperature in the computers, or battery life of the computers.

* * * * *